United States Patent [19]

Drutchas

[11] Patent Number: 4,598,787
[45] Date of Patent: Jul. 8, 1986

[54] CONTROL APPARATUS FOR POWER ASSIST STEERING SYSTEM

[75] Inventor: Gilbert H. Drutchas, Birmingham, Mich.

[73] Assignee: TRW Inc., Cleveland, Ohio

[21] Appl. No.: 676,522

[22] Filed: Nov. 30, 1984

[51] Int. Cl.[4] .................................................. B62D 5/04
[52] U.S. Cl. ................................. 180/79.1; 200/30 R; 200/153 L
[58] Field of Search ............... 180/79.1; 74/388 PS; 200/30 R, 153 L, 155 R

[56] References Cited

U.S. PATENT DOCUMENTS

| | | | |
|---|---|---|---|
| 1,146,204 | 7/1915 | Pearce | 200/155 R |
| 1,231,885 | 7/1917 | Heinze | 180/79.1 |
| 1,281,428 | 10/1918 | Stout | 180/79.1 |
| 1,364,872 | 1/1921 | Feighter | 180/79.1 X |
| 2,398,007 | 6/1944 | Hunter | 361/166 |
| 2,399,605 | 4/1946 | Schroeder | 180/65 |
| 2,553,795 | 5/1951 | Staude | 74/388 PS |
| 2,820,872 | 1/1958 | Carr | 180/79.1 X |
| 2,877,656 | 3/1959 | Orr | 74/388 PS |
| 3,166,143 | 12/1962 | Gonter et al. | 180/79.1 |
| 3,191,109 | 6/1965 | Hepner | 318/2 |
| 3,192,329 | 6/1965 | Murrle | 200/16 |
| 3,691,322 | 9/1972 | Matthews | 200/1 V |
| 3,983,953 | 10/1976 | Bayle | 180/79.1 |
| 4,103,132 | 7/1978 | Schwarzkopf | 200/153 LB |
| 4,223,254 | 9/1980 | Adams | 318/2 |
| 4,396,811 | 8/1983 | Kijucaricek | 200/1 V |
| 4,415,054 | 11/1983 | Drutchas | 180/79.1 |
| 4,471,280 | 9/1984 | Stack | 318/586 |

FOREIGN PATENT DOCUMENTS 2845864 5/1979 Fed. Rep. of Germany ..... 180/79.1

Primary Examiner—John A. Pekar
Attorney, Agent, or Firm—Yount & Tarolli

[57] ABSTRACT

The invention provides an apparatus for controlling a power assist steering system of the type having an electric assist motor connected to a steering member such as a rack and a steering shaft including first and second coaxial shaft sections rotatable with respect to each other and connected by an elastic member. One of the shaft sections is coupled to the hand wheel and the other to the steering member. A cam operated, reversing switch is coupled across the first and second shaft sections. A drive circuit and the electric assist motor are connected to the reversing switch. A control circuit measures the relative rotation between the two shaft sections and controls the drive circuit. Relative rotation of the two steering shaft sections mechanically controls the reversing switch. The electric assist motor is (i) not electrically connected to the drive circuit when the two shaft sections are in a relative null position, (ii) electrically connected to the drive circuit in one direction when the shaft sections are relatively rotated in a first direction a predetermined amount from the null position, and (iii) electrically connected to the drive circuit in the opposite direction when the shaft sections are relatively rotated in a second direction the predetermined amount from the null position. The control circuit insures that the drive circuit outputs no electrical drive signal until the shaft sections are relatively rotated the predetermined amount. The drive potential increases thereafter as the relative rotation between the shaft sections increases above the predetermined amount.

47 Claims, 22 Drawing Figures

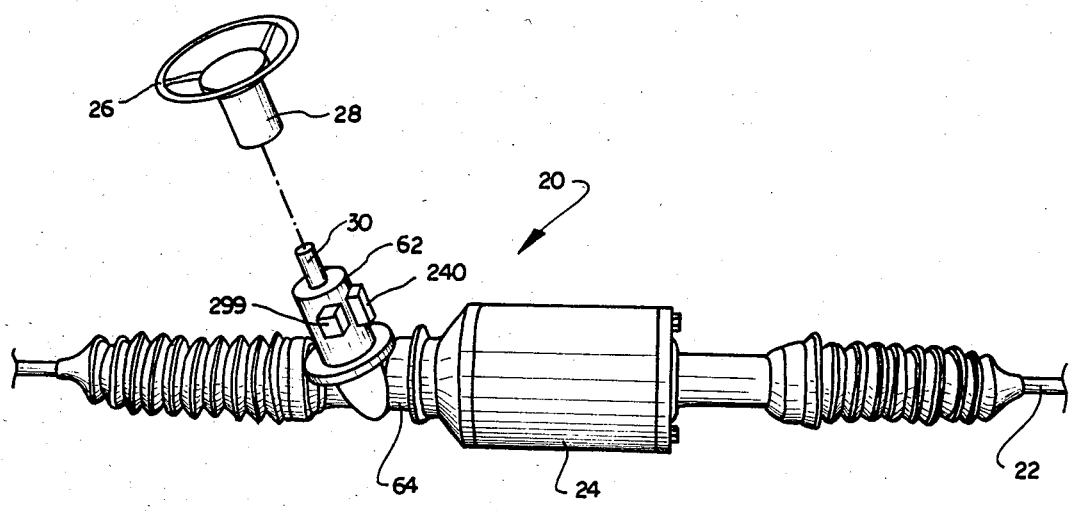
FIG. 1
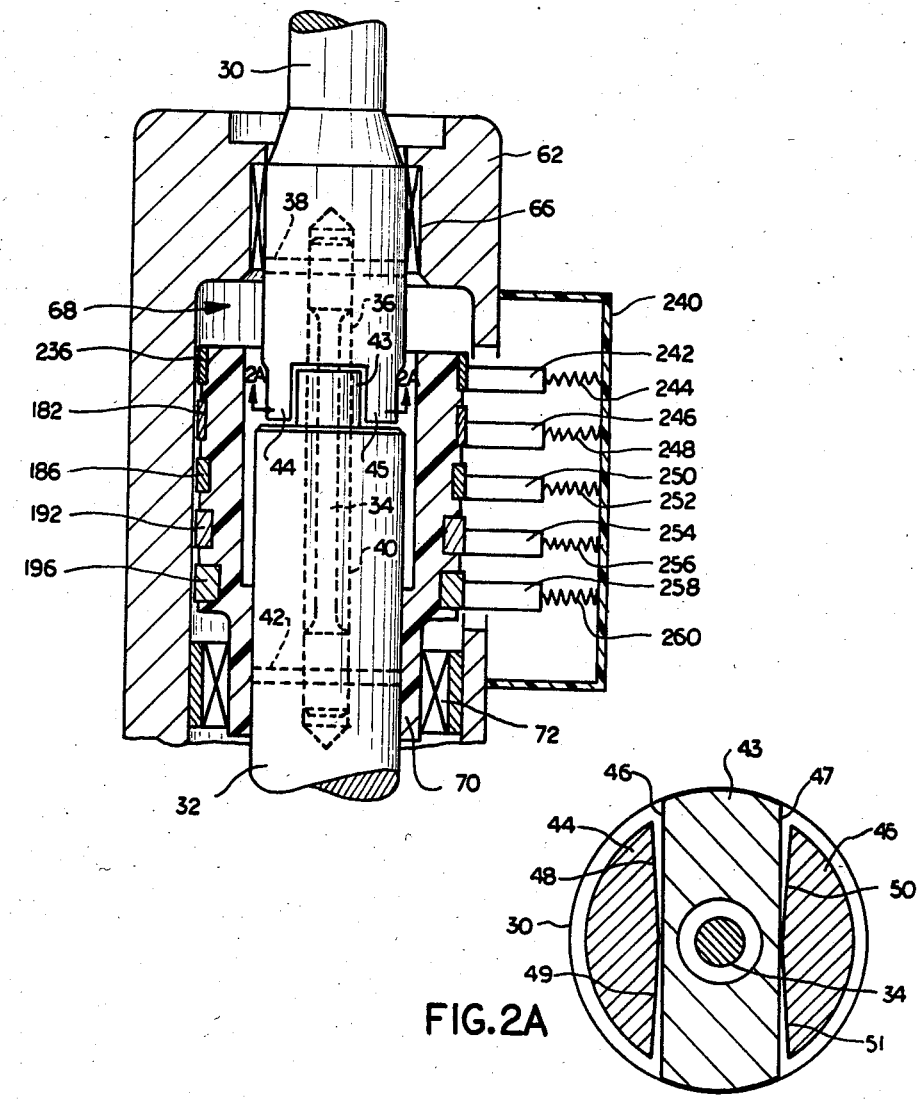
FIG. 2
FIG. 2A

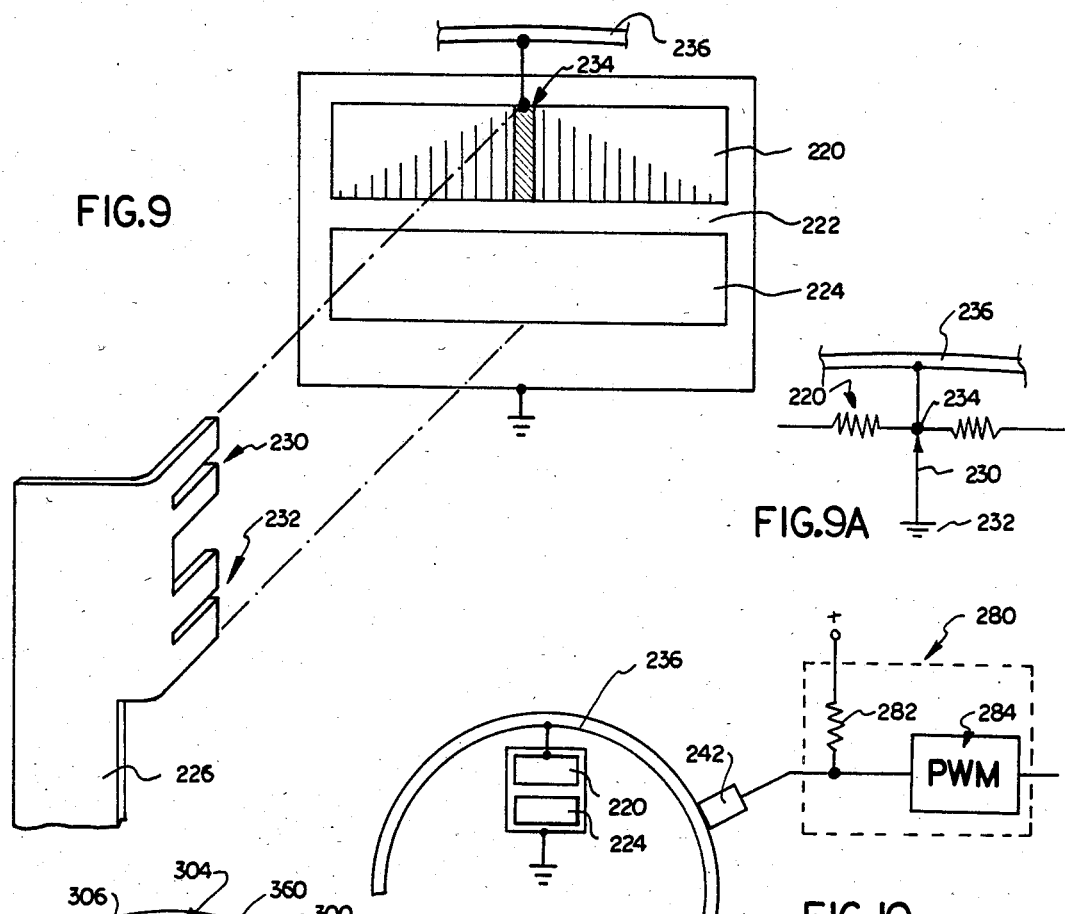
FIG.9
FIG.9A
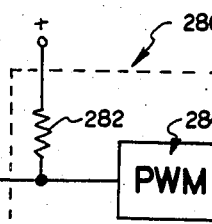
FIG.10
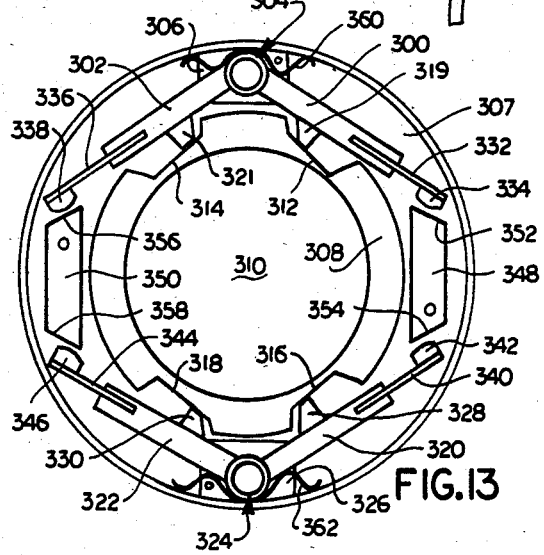
FIG.13
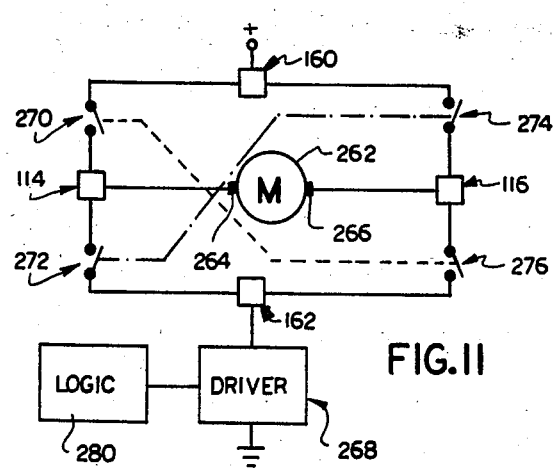
FIG.11
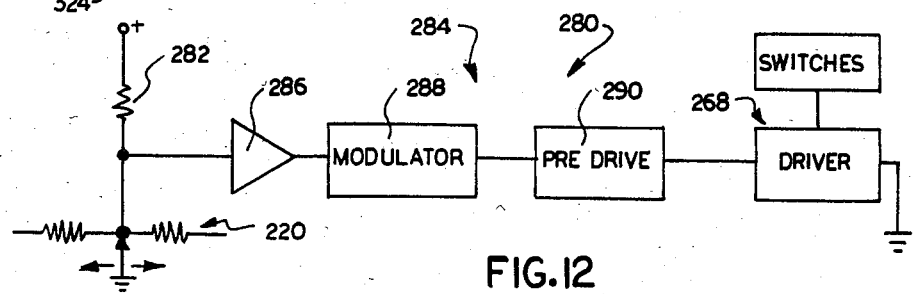
FIG.12

CONTROL APPARATUS FOR POWER ASSIST STEERING SYSTEM

TECHNICAL FIELD

The present invention relates to a power assist steering system and particularly relates to an apparatus for controlling an electric assist motor in a power assist steering system.

BACKGROUND ART

There are many known power assist steering systems. Some provide assist by using hydraulic power and others by using electric power. Examples of electric power assist systems are shown in U.S. Pat. Nos. 3,983,953 and 4,415,054.

In U.S. Pat. No. 3,983,953, the electric motor is coupled to the input steering shaft and energized in response to the torque required in turning of the manually operated hand wheel. When the hand wheel is rotated, a torque sensitive switch actuates the electric motor. The electric motor applies a drive force to the pinion and thereby assists the driver with the steering maneuver.

In particular, the '953 patent utilizes a steering shaft having two coaxial shaft sections rotatable with respect to each other. A potentiometer is connected to one of the shaft sections and the wiper arm for the potentiometer is coupled to the other shaft section through a gear arrangement. The resistance across the potentiometer is indicative of the amount of relative rotation between the two coaxial shaft sections. Two spaced apart direction contacts are provided coupled to one shaft section. A contact arm is located between the two direction contacts and is coupled to the other shaft section. When sufficient rotation occurs between the two coaxial sections, contact is made between the contact arm and one of the direction contacts. The amount of relative rotation is limited. A pin is connected to one shaft section and includes two wings which extend into a slotted sleeve arrangement connected to the other shaft section. Another embodiment of the '953 patent has a reversing switch that directly applies a bias voltage to the electric assist motor after a predetermined amount of relative rotation occurs between the two shaft sections.

U.S. Pat. No. 4,415,054, utilizes an electric assist motor having a rotatable armature encircling a force transmitting member. Rotation of the electric assist motor armature causes linear movement of the force transmitting member. The electric motor is energized in response to rotation of the steering wheel.

In particular, the '054 patent uses a steering column having two coaxial shaft sections rotatable with respect to each other. A Hall effect sensing device is located between the two steering shaft sections. A torsion bar mechanically couples the two steering shaft sections. The torsion bar is deflected in response to torque created by rotation of the hand wheel and the steered wheel resistance to turning. The amount of deflection can be used to determine the amount of assist that the system will give to a steering maneuver. An electric signal is produced by the Hall effect sensing device which is indicative of (a) the amount of relative rotation between the two shaft sections and (b) the direction of relative rotation. This signal from the Hall effect sensing device is used to control the electric assist motor.

Previous electric assist steering systems have not been concerned with the effects of electrical failures that may occur within the control system. In such systems, it is possible that an undesired electrical drive potential can be outputted to the electric assist motor upon a control system failure that would turn the vehicle when the operator does not desire nor expect such turning to occur. One example of such a system uses a Hall effect device and a processing circuit that outputs a voltage of 6 V.D.C. to keep the vehicle wheels in a known steered condition. When steering is desired, the control system generates a D.C. voltage either greater or less than 6 V.D.C. depending on the desired steering direction. If an electrical failure occurs, a signal far greater or less than the desired 6 V.D.C. can be generated causing the vehicle to take a hard turn in an undesired and unexpected manner. Also in such a system, spurious noise signals could cause actuation of the electric motor during driving which would, in turn, cause undesired and unexpected steering of the vehicle wheels.

Previous electric assist steering systems have utilized complex circuitry that (i) sensed the direction of the steering maneuver, (ii) sensed the amount of torque applied to the vehicle hand wheel, (iii) determined the amount of electric assist to provide and (iv) connected the determined drive signal to the electric motor in a manner to drive the motor in a direction responsive to the sensed direction of the steering maneuver. To improve reliability, it is desirable to reduce the amount of electronics required to accomplish the desired control of the electric assist motor.

Previous electric assist steering systems have had a problem with electric arcing across the switch contacts that connect an electric drive potential to the electric assist motor. Arcing occurs when an electric potential is present across the switch contacts prior to contact closure or present during contact opening. Continuous arcing causes premature wear and subsequent failure of the contacts. It is important that the reliability of an electric assist steering system be at least equivalent to the reliability of a hydraulic, power assist system. However, present control systems do not prevent arcing across switch contacts and, therefore, have a shorter contact life and lower operating reliability than is desired.

Previous electric assist steering systems typically would sense the direction of a steering maneuver using a sensor, such as a Hall effect device or electric contacts closed by the mechanical action of the steering maneuver. These sensed direction signals would be fed to an electronic control unit which would control application of an electric drive signal to the motor in response to the sensed signals. To improve system reliability, it is desirable to utilize the mechanical action of the steering maneuver to directly connect an electric drive potential to the electric assist motor. One proposed system divides the steering shaft into coaxial sections coupled by a torsion rod. Electric contacts are mounted on the relative rotation stops of the coaxial shaft sections. Upon relative rotation of the two shaft sections, electrical contact is made directly from the vehicle battery to the electric motor when the stops are reached. Such a system (i) does not provide for switch closure upon a small degree of rotation, (ii) does not permit continued relative rotation between the two shaft sections after contact closure occurs, and (iii) permits electrical arcing across the switch contacts.

An object of the present invention is to provide a control apparatus for an electric power assist steering system that will not output an effective drive potential to an electric motor of the electric power assist system if a system failure occurs when the operator does not desire to make a steering maneuver. If system failure occurs, it is desirable to steer the wheels only when the operator wishes to make a steering maneuver and that the failure only affect the degree of steering assist and not cause uncontrolled steering action.

Another object of the present invention is to provide a control apparatus including a simple drive circuit that outputs an effective drive potential to an electric motor of an electric power assist steering system. It is also desirable to direct the effective drive potential to the electric assist motor by the mechanical action of the relative rotation between the input shaft and the pinion shaft. This greatly reduces the amount of electronics involved.

Still another object of the present invention is to provide a control apparatus that does not permit an electrical drive circuit to output an electrical drive potential until electrical connections are made between the electric assist motor and the electrical drive circuit to prevent arcing across electrical contacts of connection switches.

Yet another object of the present invention is to provide a control apparatus for an electric assist steering system that (i) directly connects a variable drive voltage to an electric motor of the electric assist steering system upon a small degree of relative rotation between two coaxial steering shaft sections and (ii) permits continued relative rotation between the two steering shaft sections after the variable drive potential is connected to the electric motor.

SUMMARY OF THE INVENTION

The present invention is used in a power steering system of the type having an electric assist motor for driving a member of a vehicle steering gear set such as a rack and having a steering shaft including first and second coaxial shaft sections which are relatively rotatable and coupled by a resilient member. One of the shaft sections is coupled to a manually operated hand wheel and the other section is coupled to the pinion of the steering gear set.

The present invention provides a new and improved apparatus for controlling application of electrical signals used by an electric assist motor in a power assist steering system. The new apparatus is designed to control (a) the direction of rotation of the electric motor and (b) the assisting force applied by the electric motor to a steering member.

A control apparatus is provided that accounts for the possibility of electrical failures in the control system. The control system only applies an electric signal to the power assist motor when it is desired to make a steering maneuver. The control circuit of the present invention outputs a drive potential that is proportional to the amount of desired steering assist. The drive potential is not connected to the electric motor until the amount of applied torque to an operator hand wheel exceeds a predetermined value. If an electrical failure were to generate no drive potential, all steering would still be accomplished manually If an electrical failure were to generate a maximum drive potential, the electric motor would not be energized until the predetermined amount of torque was exceeded. In such a failure, all steering maneuvers would have maximum assist. The application of the drive signal is mechanically controlled and no drive signal is applied until a predetermined amount of torque is applied to accomplish a steering maneuver.

A simplified control circuit is provided to control the drive potential applied to the electric assist motor. A switch apparatus connects the control circuit and one electrical potential, preferably ground, to the electric assist motor in a manner responsive to the direction of the steering maneuver. The control circuit includes a solid state switching device connected between a second drive potential and the switch apparatus. The control circuit controls the "ON" and "OFF" time of the solid state switching device in response to the amount of relative rotation between the first and second drive shaft sections. The control of the switching device controls the amount of effective drive potential applied to the electric assist motor.

An electronic control means is further provided to control the drive potential outputted to the electric assist motor in response to the sensed relative rotation between the first and second shaft sections such that no arcing will occur upon switch opening or closing. The sensing means generates a zero position signal as long as the first and second shaft sections are relatively rotated less than a predetermined angle in either direction from an absolute relative null position. No drive potential signal is outputted by the control means until the first and second shaft sections are rotated with respect to each other by the predetermined angle which is equal to a predetermined steering torque. Electrical connections to the electric assist motor are made by the apparatus prior to the first shaft section and the second shaft section being rotated with respect to each other by an amount equal to the predetermined angle. No electrical drive potential is present at the electrical contacts until after closure occurs between appropriate contacts. Since contact closure occurs prior to the presentment of a drive potential across the contacts, no current will flow upon closure and no arcing will occur. Prevention of electrical arcing enhances contact life. Also, after a steering maneuver has been completed, the drive circuit decreases the current through the motor such that the current equals zero prior to the relative rotation between the shaft sections reaching the predetermined angle from the absolute null position. Since the drive potential is removed from the contacts prior to their opening, electrical arcing is prevented during switch opening which also enhances switch life.

The apparatus for controlling the electric motor includes a cam having a plurality of cam faces. The cam is fixed to the first steering shaft section. A plurality of cam followers are coupled to the second shaft section. Each cam follower is associated with at least one cam face. A plurality of first electrical contacts are provided. Each cam follower carries at least one first electrical contact. A plurality of second electrical contacts are provided coupled to the second steering shaft section. Each first electrical contact has an associated second electrical contact. The cam, cam followers and the first and second electrical contacts provide (i) no closure between the first electrical contacts and their associated second electrical contacts when the first and second shaft sections are within a relative rotational position defining a null position, (ii) closure between some of the first electrical contacts and their associated second electrical contacts when the first and second shaft sections are relatively rotated in one direction from the null position, and (iii) closure between the remainder of the first electrical contacts and their associated second electrical contacts when the first and second shaft sections are relatively rotated in the other direction from the null position. The apparatus also includes a means for sensing the relative rotation between the two shaft sections. The sensing means includes a means for providing an electrical signal indicative of the amount of relative rotation between the two shaft sections.

DESCRIPTION OF THE DRAWINGS

Other features and advantages of the invention will be apparent to those skilled in the art by reference to the following detailed description taken in connection with the accompanying drawings wherein:

FIG. 1 is a schematic perspective view illustrating a vehicle steering system embodying the present invention;

FIG. 2 is a side elevational view partially in section illustrating a portion of the system of FIG. 1 with parts removed for clarity;

FIG. 2A is a plan view taken along line 2A—2A of FIG. 2;

FIG. 9 is an enlarged schematic view of a portion of the mechanism seen in FIG. 8; FIG. 9A is a schematic representation of the mechanism of FIG. 9; FIG. 10 is a schematic illustration of a portion of the present invention;

FIG. 11 is a schematic illustration of the control circuitry in accordance with the present invention;

FIG. 12 is a block diagram illustration of a portion of the control circuitry of FIG. 11;

FIG. 13 is a plan view of another embodiment of the present, invention similar to FIG. 4;

BEST MODE FOR CARRYING OUT THE INVENTION

Figure 7:
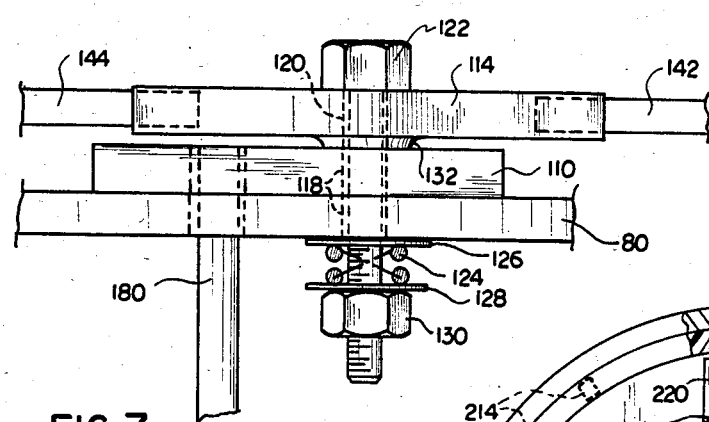
FIG. 7 is a plan view taken along line 7—7 of FIG. 4.
Figure 8:
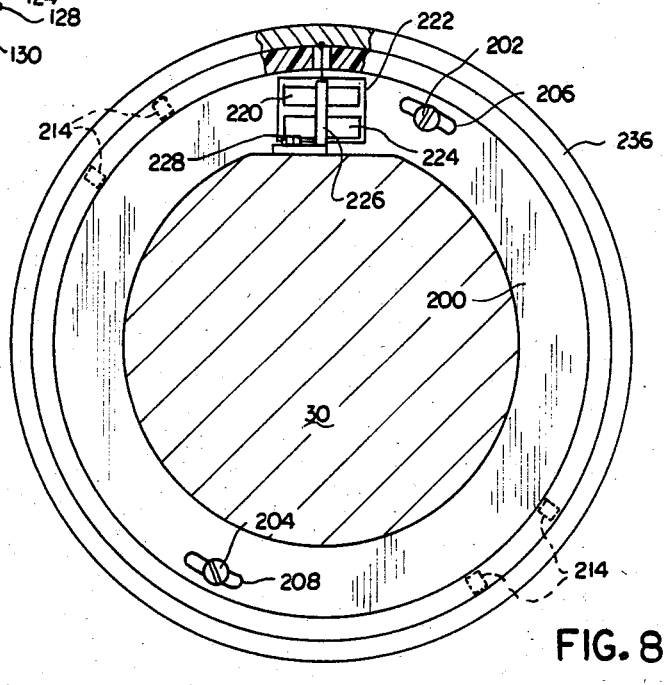
FIG. 8 is a plan view taken along line 8—8 of FIG. 3.
Figure 3:
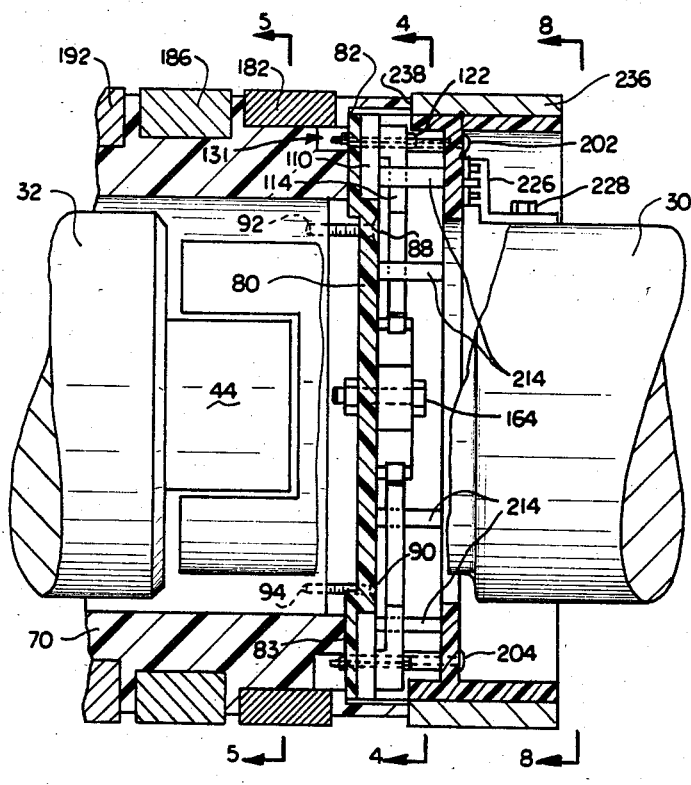
FIG. 3 is an enlarged side elevational view partially in section of a portion of the system of FIG. 2.

Referring to FIG. 1, a power assist steering system 20 includes a steering member 22 in force transmitting engagement with the steered or dirigible wheels of an automotive vehicle (not shown) in a known manner. An electric assist motor located in housing 24 encircles the steering member 22. One type of arrangement between the electric assist motor and steering member that can be utilzed with the present invention is fully described in U.S. Pat. No. 4,415,054 to Drutchas which is fully incorporated herein by reference.

The electric assist motor disclosed in the Drutchas '054 patent is a reversible, permanent magnet electric motor that rotates in a direction depending on the magnitude and direction of current flow through the windings of the motor armature. The steering member 22 is assisted by current flow in the armature of the electric motor in an appropriate current flow direction. The electric assist is determined by the magnitude of the voltage signal.

The steering system 20 includes an operator controlled hand wheel 26 which is connected through a steering column 28 to an input shaft 30 in a known manner.

In FIGS. 2 and 2A, a pinion shaft 32 is drivingly connected to rack teeth (not shown) of the drive member 22 in a known manner. The input shaft 30 is coupled to the pinion shaft 32 by a resilient member such as a torsion bar 34. One end of the torsion bar 34 is in a bore 36 in the input shaft 30 and is fixed near its end by a pin 38. The other end of the torsion bar 34 is received in a bore 40 in the pinion shaft 32 and is fixed near the end by a pin 42.

Pinion shaft 32 and input shaft 30 have projections 43 and 44, 45, respectively, which form a coupling junction therebetween.

The input shaft 30 and the pinion shaft 32 are coaxially aligned and can be rotated with respect to each other. Relative rotation between the input shaft 30 and the pinion shaft 32 will be limited by side walls 46, 47 of projection 43 contacting stop surfaces 48, 49 and 50, 51, of the projections 44, 45. The torsion bar 34 resists relative rotation between the input shaft 30 and the pinion shaft 32. During a steering maneuver, an operator turning the hand wheel 26 causes the input shaft 30 to rotate. If there is little resistance to turning of the vehicle's steered wheels, the input shaft and the pinion shaft will rotate together, the relative rotation being coupled through the torsion bar 34. When the vehicle is at a standstill on a dry paved surface, the steering system encounters maximum resistance to turning of the vehicle wheels and requires significant torque on the hand wheel. Initiation of a steering maneuver through the hand wheel 26 under such condition, causes the input shaft 30 to rotate with respect to the pinion shaft 32 and the torsion bar 34 will twist under the influence of torque in a known manner. The stop surfaces 48, 49, 50 and 51 are provided to allow only a limited predetermined amount of relative rotation between the input shaft and the pinion shaft. Thereafter, the input shaft and the pinion shaft will be mechanically coupled and rotate together.

Figure 14:
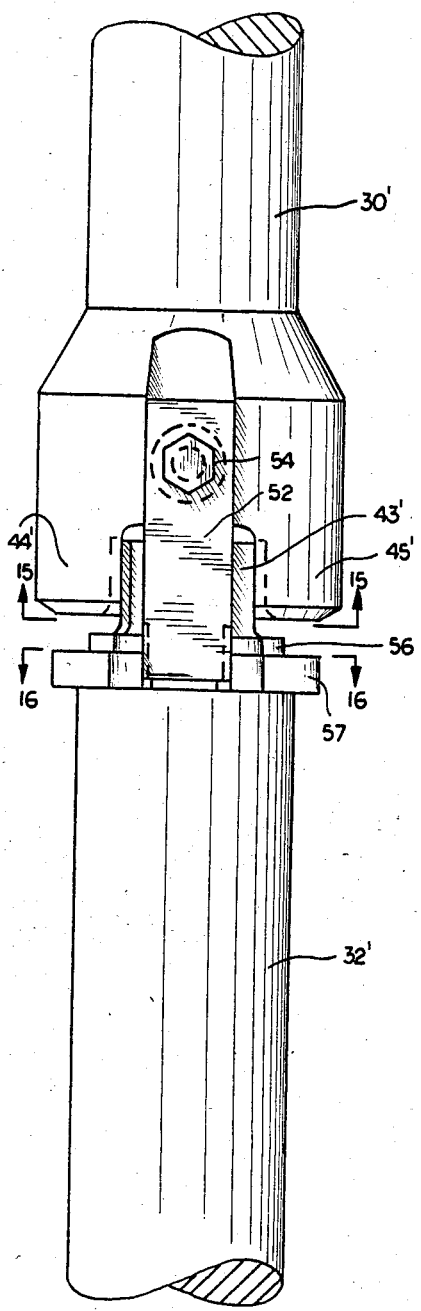
FIG. 14 is a top plan view showing another embodiment of a resilient connection between the input shaft and the output shaft.
Figure 16:
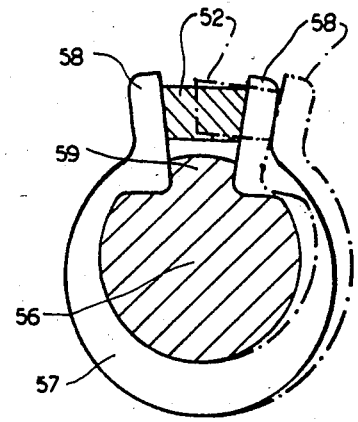
FIG. 16 is a side elevational view partially in section taken along line 16—16 of FIG. 14.
Figure 15:
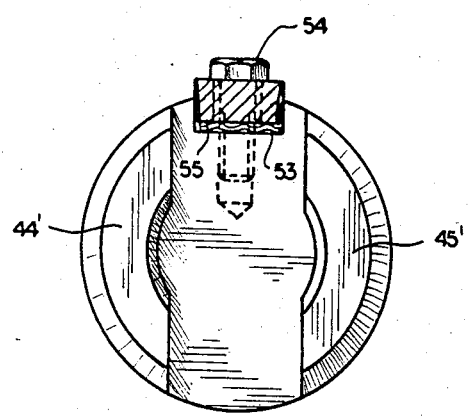
FIG. 15 is a side elevational view partially in section taken along line 15—15 of FIG. 14 with parts removed for clarity.

Referring to FIGS. 14–16, a preferred embodiment of a resilient coupling between the input shaft and the pinion shaft for use with the present invention is shown. The input shaft 30' includes projections 44', 45' and a drive key 52 mounted in receiving slot 53 by means of a bolt 54 received in a threaded bore in the input shaft 30'. A wave washer 55 is positioned between the drive key 52 and the bottom of receiving slot 53 and permits vertical adjustment of drive key 52 in the receiving slot 53. Slot 53 prevents any rotational movement of drive key 52 about an axis defined by the mounting bolt 54.

Pinion shaft 32' has a mounting member 56 fixed at its end facing the input shaft 30'. A projection 43' extends from the pinion shaft 32' and is received in the projections 44', 45' in a manner as described above. The projections 43' and 44', 45' limit the amount of relative rotation between the input shaft 30' and the pinion shaft 32' as described above.

A CIR-CLIP 57 is mounted on the mounting member 56 and includes spaced apart lugs 58 that receive a tapered end of drive key 52. Mounting member 56 includes an extension arm 59 which extends between lugs 58. The extension arm 59 functions as a retaining support and as a lug retaining means. Referring to FIG. 16, when there is no relative rotation between the input shaft 30' and the pinion shaft 32', lugs 58 are both in contact with the sides of drive key 52 and with the sides of extension arm 59. The drive key 52 is coupled to the input shaft 30' and the mounting member 56 is coupled to the pinion shaft 32'. Once relative rotation occurs between the input shaft 30' and the pinion shaft 32', the drive key 52 will force one of the lugs 58 away from one side of the extension arm 59 in a manner as is depicted in phantom in FIG. 16.

The CIR-CLIP 57 thus functions as a bias spring which resists the relative rotation between the two shaft sections 30', 32'. The amount of relative rotation between the input and output shafts is a function of the spring-rate of the CIR-CLIP 57 and the amount of applied torque. The amount of initial spring loading (preloading) of the CIR-CLIP 57 can be adjusted by the verticle position of the drive key 52 in receiving slot 53.

This CIR-CLIP arrangement gives a more "mechanical feel" or "positive feel" to operator steering than exists in a torsion bar arrangement. Further details of a CIR-CLIP arrangement are disclosed in British Pat. No. 1,603,198 which is fully incorporated herein by reference.

Figure 4:
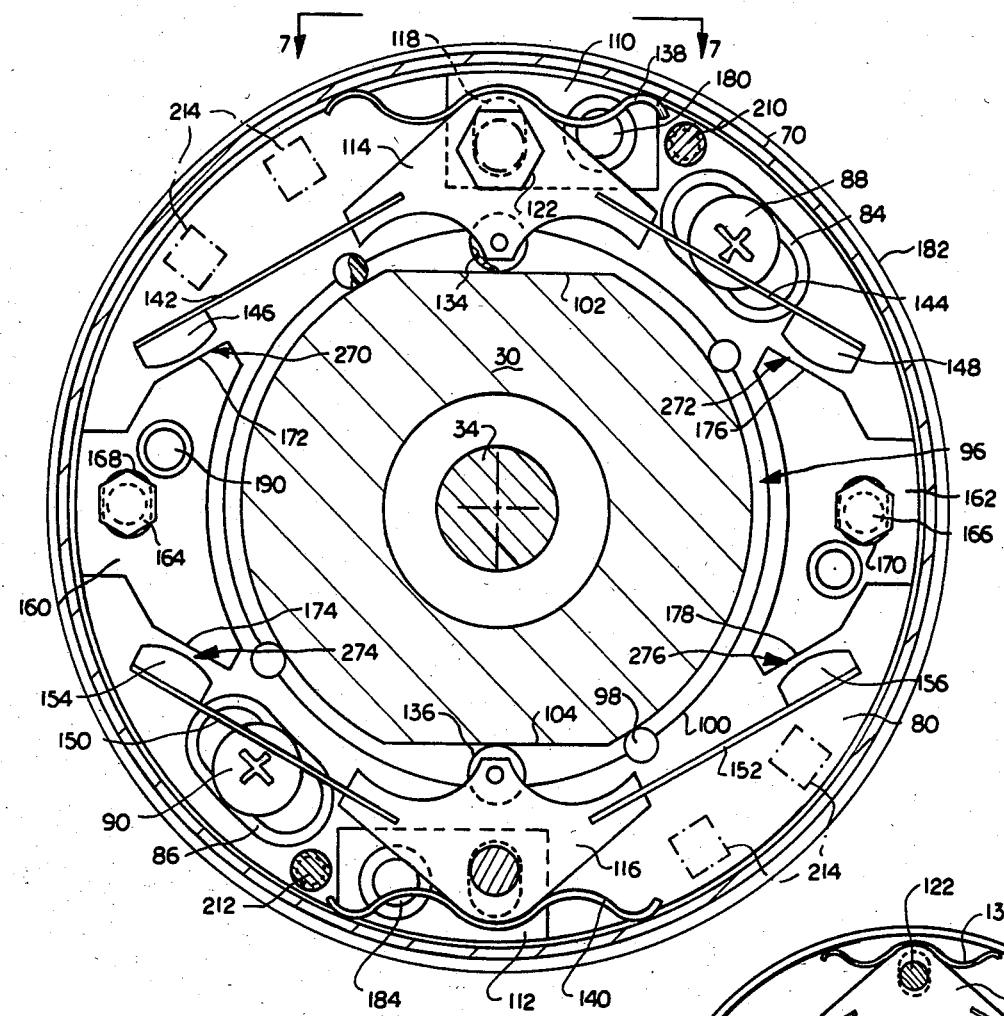
FIG. 4 is a plan view taken along line 4—4 of FIG. 3 with parts removed for clarity.

Referring to FIGS. 1, 2 and 4, the input shaft and pinion shaft coupling junction is located within a pinion tower housing 62. The pinion tower housing 62 may be integral with a housing member 64 surrounding the steering member 22. The pinion tower housing 62 includes a bearing 66 rotatably supporting the input shaft 30. The pinion tower housing 62 includes a chamber 68. The input shaft 30 extends into the chamber 68.

A housing member 70 circumferentially surrounds and is fixed to an end portion of the pinion shaft 32 for rotation therewith. The housing member 70 and the end of the pinion shaft 32 are located in the chamber 68 and are rotatably supported by bearing 72. The pinion shaft 32 is coaxially aligned with the input shaft 30. The housing member 70 is fixed to the pinion shaft 32 and relative rotation between the input shaft 30 and the pinion shaft 32 will cause commensurate relative rotation between the input shaft 30 and the housing member 70. Housing member 70 is made from an electrically nonconductive material.

Referring now to FIGS. 3 through 6, housing member 70, as mentioned, is fixed at one end to the pinion shaft 32. The other end of the housing member 70 is open and surrounds the end of the input shaft 30.

A switch holding plate 80 is located in an annular recessed portion 82 of the housing member 70 and abuts annular surface 83. Switch holding plate 80 has elongated openings 84, 86 therethrough. Screws or stove bolts 88, 90 extend through the openings 84, 86 and are received in threaded bores 92, 94 of the housing member 70 respectively to hold switch plate 80 to the housing 70. This arrangement permits adjustment of the relative rotational position between the switch holding plate 80 and the housing member 70, the significance of which will be discussed below. The switch holding plate 80 is preferably made from an electrically nonconductive material or a conductive material covered with an insulating material to insure electrical isolation of the holding plate 80.

The switch holding plate 80 has a generally cylindrical opening 96 defined by inner wall 100 and surrounds the input shaft 30. Bearings 98 are circumferentially spaced and held in appropriate openings in the inner wall 100 of switch holding plate 80. The bearings 98 contact the input shaft 30 and insure axial alignment between the input shaft 30 and the switch holding plate 80. The bearings 98 are preferably made from electrically nonconductive material.

Input shaft 30 has diametrically opposed cam surfaces 102, 104 disposed along an area of the generally cylindrical inner surface of input shaft 30 adjacent the switch holding plate 80. The cam surfaces 102, 104 may be fixed to input shaft 30 or may be integrally formed as part of the input shaft 30. Switch holding plate 80 carries two diametrically opposed internal electrical brush members 110, 112. Cam followers 114, 116 are in brush surface contact with internal brush members 110, 112 respectively. Each cam follower and its associated internal brush member has a similar structure and is mounted to the switch holding plate 80 in a similar manner. Therefore, only one cam follower and its associated internal brush member will be discussed in detail it being understood that the other cam follower and associated internal brush member is similarly constructed and mounted to the switch holding plate.

Referring to FIGS. 4 and 7 internal brush member 110 is fixed to the switch holding plate 80. Internal brush member 110 and the switch holding plate 80 have coaxially aligned elongated openings 118 therethrough. Cam follower 114 has a through bore 120 that receives bolt 122. Bolt 122 extends through bore 120 and through the openings 118. A spring 124 is disposed between washers 126, 128, and is held under compressive force by nut 130. This arrangement secures the cam follower 114 to the internal brush member 110 but permits the cam follower to pivot and to move within the slotted opening 118. A recess 131 (FIG. 3) is located in housing member 70 and provides clearance for the end of bolt 122, nut 130, washers 128, 126 and spring 124.

The cam follower 114 has a shoulder 132 abutting the internal brush member 110 and providing brush surface electrical contact between the internal brush member 110 and the cam follower 114. Internal brush member 110 is made of a suitable electrically conductive brush material and the cam follower 114 with its protrusion 132 is made of a suitable electrically conductive material.

Referring to FIG. 4, cam followers 114, 116 have a follower wheel 134, 136 adapted to ride against the cam surfaces 102, 104 respectively. The follower wheels 134, 136 are rotatably secured to their associated cam followers 114, 116. The follower wheels 134, 136 are preferably made from an electrically non-conductive material such as plastic to avoid an electrical connection between the cam followers 114, 116 and the input shaft 30. Springs 138, 140 are operatively connected to the housing member 70 and to the cam followers 114, 116 respectively to bias the cam followers 114, 116 against the cam surfaces 102, 104.

Cam follower 114 has arms 142, 144. The distal ends of arms 142, 144 carry electrical contacts 146, 148 respectively. Cam follower 116 has arms 150, 152. The distal ends of arms 150, 152 carry electrical contacts 154, 156 respectively. The arms and the contacts carried by the cam followers are made of conductive material. Hence, the cam followers are in electrical communication with the electric contacts carried thereby.

Switch holding plate 80 also carries diametrically opposed electrical post members 160, 162. The electrical post members 160, 162 are secured to the switch holding plate 80 by means of bolts 164, 166 respectively. The electrical post members 160, 162 have elongated through bores 168, 170 that receive bolts 164, 166 respectively and permit limited pivotal and circumferential motion of each of the electrical post members.

Electrical post member 160 includes electrical contact surfaces 172, 174 associated with the electrical contacts 146, 154 respectively. Electrical post member 162 includes electrical contact surfaces 176, 178 associated with the electrical contacts 148, 156 respectively. Electrical post members 160, 162 are made from electrically conductive material.

Since the switch holding plate 80 is fixed to the housing member 70, the switch holding plate 80 in effect is coupled to the pinion shaft 32. Therefore, relative rotational motion occurs between the input shaft 30 and the switch holding plate 80 commensurate with the relative rotation between the input shaft 30 and the pinion shaft 32. The cam surfaces 102, 104 of the input shaft 30 are parallel with respect to each other. The switch holding plate 80 and the electrical post members 160, 162 can be adjusted so that when there is no relative rotation between the input shaft 30 and the pinion shaft 32, the electrical contacts 146, 148, 154, and 156 all remain substantially equally spaced from their associated electrical contact surfaces 170, 172, 174, and 176 on the respective electrical post members. This condition of having equal spacing between contacts and their associated contact surfaces, shown in FIG. 4, defines an absolute null position.

Figure 4A:
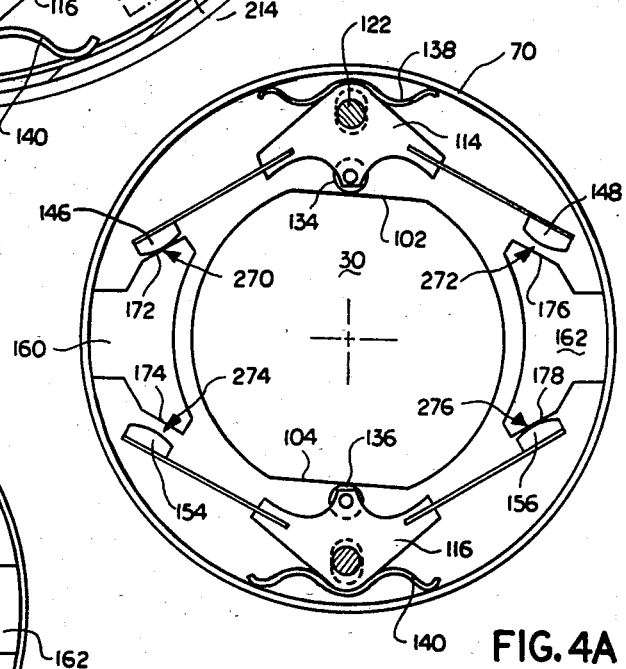
FIGS. 4A—4C are schematic illustrations of parts of the system of FIG. 1 showing the operation of the parts.
Figure 4B:
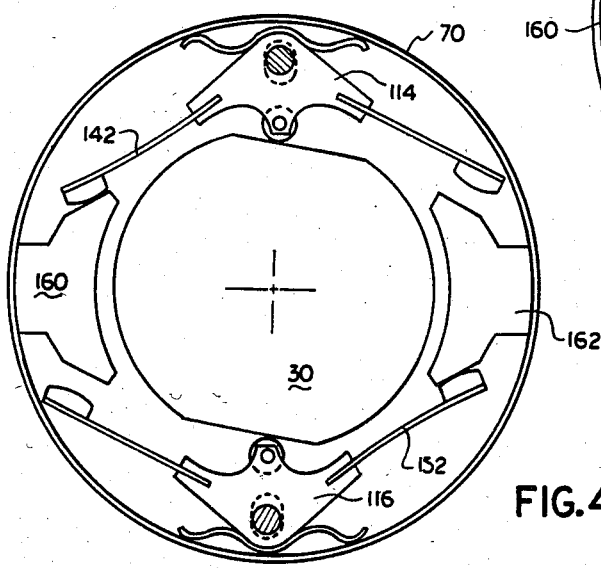
Figure 4C:
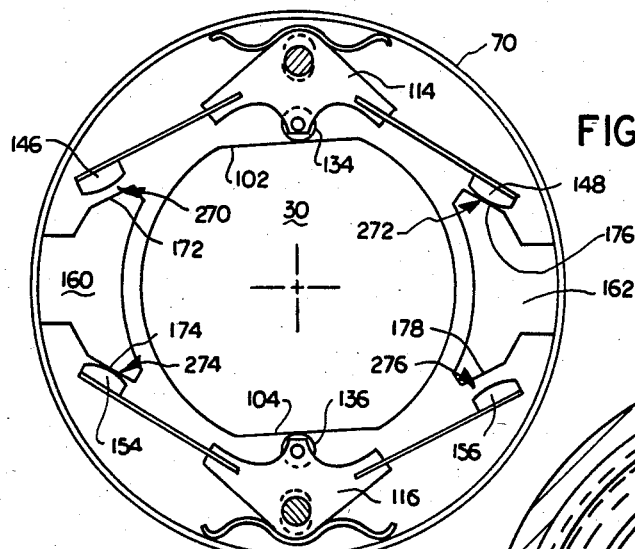

Referring now to FIGS. 4A-4C different degrees of relative rotation between the input shaft 30 and the pinion shaft 32 are depicted. If there is sufficient resistance to turning of the vehicle wheels during a steering maneuver, the input shaft 30 will rotate with respect to the pinion shaft 32. The relative rotation between the input shaft 30 and the pinion shaft 32 is related to the torque applied to the hand wheel to turn the vehicle wheels. FIG. 4A depicts a condition when the input shaft 30 rotates clockwise with respect to the pinion shaft 32 and with respect to the housing member 70. Cam surface 102 acts against the follower wheel 134 of the cam follower 114 causing the cam follower 114 to pivot about an axis defined by bolt 122. Also, the cam follower 114 will slide in the slotted opening 118 against the spring bias force created by spring 138. Similarly, cam follower 116 pivots and slides by action of the cam surface 104 against the follower wheel 136. FIG. 4A depicts the condition where there is sufficient relative rotation between the input shaft 30 and the pinion shaft 32 from the absolute null position to move electrical contact 146 against the electrical contact surface 172 and the electrical contact 156 against electrical contact surface 178. It will be appreciated that the depicted condition in FIG. 4A provides electrical contact between the cam follower 114 and the electrical post member 160 and electrical contact between the cam follower 116 and the electrical post member 162.

FIG. 4B depicts a condition similar to FIG. 4A, i.e., relative rotation of the input shaft 30 with respect to the pinion shaft 32 in a clockwise direction. The specific condition depicted in FIG. 4B illustrates that, although electrical contact occurs between the cam followers and the electrical post members upon the degree of relative rotation depicted in FIG. 4A, further relative rotation is permitted between the input shaft 30 and the pinion shaft 32. The further relative rotation deflects the arms 142, 152. This deflection is caused by the further action of the cam surfaces 102 acting against the follower wheel 134 of the cam follower 114 and the further action of the cam surface 104 against the follower wheel 136 of the cam follower 116. This further action of the cam surfaces against the cam followers causes further pivotal motion of the cam followers and further sliding of the cam followers in their associated slotted openings. The deflection of the arms 142, 152 does not effect the electrical contact between the cam follower 114 and the electrical post member 160 and the electrical contact between the cam follower 116 and the electrical post member 162. The oblique angle between stop surfaces 48, 49 and between stop surfaces 50, 51 are sufficient to permit the extended relative rotation as depicted in FIG. 4B. The importance of this particular arrangement that permits further relative rotation after electrical contact is discussed below.

Referring now to FIG. 4C, wherein the input shaft 30 is rotated in a counterclockwise direction with respect to the pinion shaft 32. Cam surface 102 acts against the follower wheel 134 to pivot the cam follower 114 causing electrical contact 148 to contact the contact surface 176 of the post member 162. Cam surface 104 acts against the follower wheel 136 to pivot the cam follower 116 about an axis defined by its mounting bolt causing the electrical contact 154 to contact the electrical contact surface 174. A condition depicted in FIG. 4C causes electrical contact between the cam follower 114 and the post member 162 and electrical contact between the cam follower 116 and the post member 160.

Figure 5:
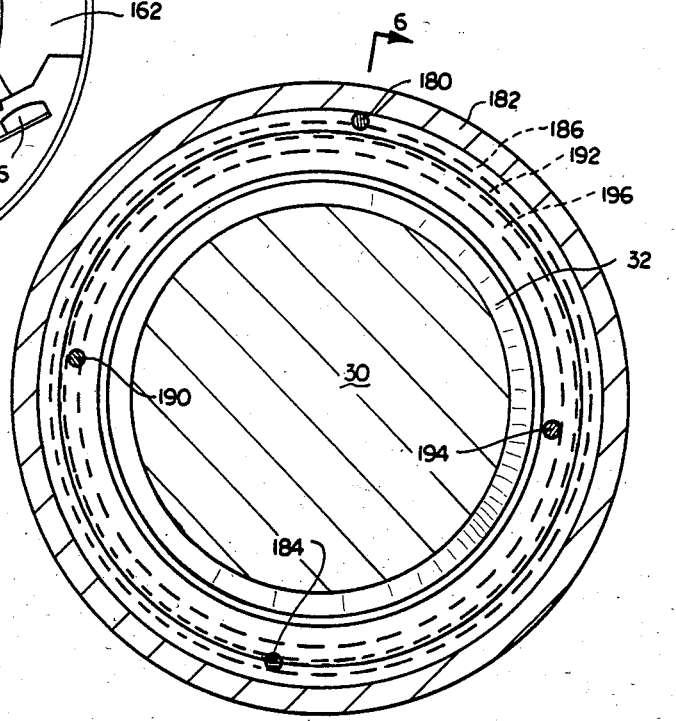
FIG. 5 is a plan view taken along line 5—5 of FIG. 3 with parts removed for clarity.
Figure 6:
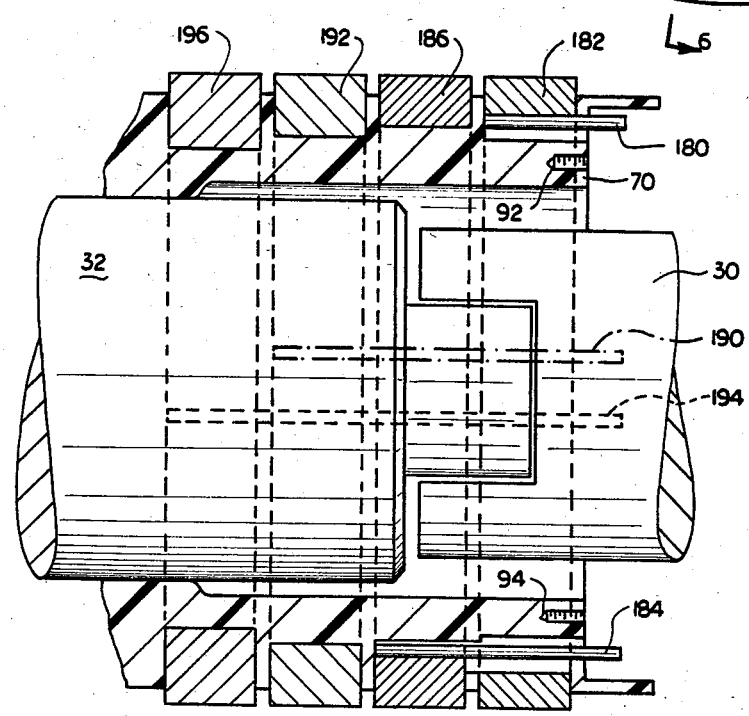
FIG. 6 is an enlarged side elevational view partially in section taken along line 6—6 of FIG. 5 with parts removed for clarity.

Referring to FIGS. 5 and 6, connecting rods 180, 184, 190 and 194 are electrically connected to an annular slip rings 182, 186, 192 and 196, respectively, and are all fixed in the housing member 70. The connecting rods 180, 184, 190 and 194 each respectively extend through a bore in the switch holding plate 80 and into a bore of the brush members 110, 112 and post members 160, 162. The connecting rods are of smaller diameter than the bores in their associated internal brush member or post members and the switch holding plate 80 through which they extend. Thus, the switch holding plate 80 can be rotated relative to the housing member 70 for the initial adjustment of the spacing between the electrical contacts and their associated contact surfaces. The connecting rods are soldered into the receiving bore of their associated internal brush members or post members.

It is contemplated that all of the connecting rods can be mechanically and electrically connected to their associated slip ring by means of solder.

The slip rings 182, 186, 192, and 196 are axially spaced and coaxial with the axis of rotation of the input shaft 30 and the pinion shaft 32. The outer diameter of all the annular slip rings are equal. To insure electrical connection between an electrical connecting rod and only one annular slip ring, each annular slip ring extends to a different depth within the housing member 70 than any of the other slip rings. In other words, the inside diameter of each of the four annular slip rings are different. The inside diameter of the annular slip ring 182 is greater than the inside diameter of the annular slip ring 186 which is in turn greater than the inside diameter of the annular slip ring 192 which is in turn greater than the inside diameter of the annular slip ring 196.

Each of the electrical connecting rods 180, 184, 190, and 194 extend along an axis parallel with the axis of rotation between the input shaft 30 and the pinion shaft 32 and each is secured to the inside diameter of its associated annular slip ring. Since each slip ring has a different inside diameter as discussed above, the connecting rods will contact only their associated slip ring.

Referring to FIGS. 3, 4, 8, 9 and 9A, a resistor holding plate 200 is secured to the switch holding plate 80 by means of screws or bolts 202, 204 extending through elongate openings 206, 208 and received in threaded bores 210, 212 of the switch holding plate 80 respectively. The elongate openings 206, 208 permit the resistor holding plate 200 to rotate with respect to the switch holding plate 80 for adjustment purpose which are discussed below. The resistor holding plate 200 has a plurality of legs 214 that extend from the resistor holding plate 200 and rest against the switch holding plate 80. The legs 214 maintain the resistor holding plate 200 spaced from the switch holding plate 80 so that the resistor holding plate 200 does not interfere with the mechanical operation of the cam followers and electrical contacts on the switch holding plate 80. Alternatively, spacers can be located on the screws or bolts 202, 204 to maintain the resistor holding plate 200 spaced from the switch holding plate 80.

The resistor holding plate 200 carries a tesistive strip 220 mounted on and electrically isolated from a substrate 222. The substrate 222 also carries a ground strip 224 electrically separated from the resistive strip 220. The resistive strip 220 can either be a thick film resistor or a polymer film resistor. The lines on the resistor strip 220, seen in FIG. 9, represents laser trimming of the resistor strip which method is known in the art and will not be described herein. The ground strip 224 is preferably made of a polymer film and has extreme low impedence between itself and the substrate 222. The substrate 222 is electrically grounded which effectively grounds the strip 224.

An arm 226 is attached to the input shaft 30 by means of a bolt 228. Arm 226 includes two sets of fingers 230, 232 adapted to contact the resistance strip 220 and the ground strip 224, respectively. The resistor holding plate 200, which is connected to the switch holding plate 80, couples the resistor holding plate 200 to the pinion shaft 32. Therefore, relative rotation between the input shaft 30 and the pinion shaft 32 will move the fingers 230, 232 of the arm 226 across the resistive strip 220 and the ground strip 224. The arm 226 and fingers 230, 232 always remain grounded. The purpose of using a polymer film ground strip is to add wear life to the fingers 232.

A portion 234 of the resistive strip 220 is electrically connected to an annular slip ring 236 carried by the resistor holding plate 200. The outer diameter of the annular slip ring 236 is equal to that of the annular slip rings 182, 184, 192, and 196 and preferably abuts against housing member 70 at annular surface 238. The resistance between the fingers 230 and the annular slip ring 236 is equal to 0 as long as the fingers 230 remain within the portion 234. As the arm 226 moves due to relative rotation between the input shaft 30 and the pinion shaft 32, which causes the fingers 230 to traverse across the resistive strip 220, the resistance between the annular slip ring 236 and the fingers 230 increase linearly. The amount of resistance is indicative of the amount of relative rotation between the input shaft 30 and the pinion shaft 32. FIG. 9A shows schematically the circuit of FIG. 9 in which the fingers traversing across the resistive strip 220 increases the resistance between the slip ring 236 and ground.

When there is no relative rotation between the input shaft 30 and the pinion shaft 32, as shown in FIG. 4, the fingers 230 lie within the portion 234 of the resistive strip 220. The fingers 230 can lie anywhere within the portion 234, during a null condition of the input shaft and the pinion shaft. The fingers 230 are exactly in the center of portion 234 during an absolute null condition described above. The portion 234 is of sufficient width to insure closure of the electrical contacts of both cam followers and the electrical contact surfaces of both electrical post members, as shown in FIGS. 4A and 4C, before the fingers 230 leave the portion 234.

The switch holding plate 80 and the resistor holding plate 200 are adjustable to insure substantially equal spacing of the electrical contacts 146, 148, 154 and 156 from their associated contact surfaces 172, 174; 176 and 178, respectively, when the fingers 230 are in the middle of the portion 234 for an absolute null position when there is no relative rotation between the input shaft 30 and the pinion shaft 32. Any relative rotation that does not close the contacts against their associated contact surfaces is a null position.

Referring to FIG. 2, a brush box 240 is attached to the pinion tower 62 and contains several communication brushes. A communication brush 242 is biased against the annular slip ring 236 by means of a spring 244. A communication brush 246 is biased against the annular slip ring 182 by means of a spring 248. A communication brush 250 is biased against the annular slip ring 186 by means of a spring 252. A communication brush 254 is biased against the annular slip ring 192 by means of a spring 256. A communication brush 258 is biased against the annular slip ring 196 by means of a spring 260. External electrical connections are made to each of the communication brushes 242, 246, 250, 254 and 258 in a known manner.

Referring to FIGS. 1-12, and electrical assist motor 262 has two connection terminals 264, 266 and includes a drive member that rotates in a direction deponding on the magnitude and direction of the current flow through the motor.

Terminal 264 of motor 262 is electrically coupled to the cam follower 114 through the communication brush 246, slip ring 182, connecting rod 180 and internal brush member 110. The connection terminal 266 of the electrical assist motor 262 is electrically coupled to the cam follower 116 through the communication brush 250, annular slip ring 186, connecting rod 184 and internal brush member 112. The positive terminal of a vehicle battery is operatively connected to the electrical post member 160 through the communication brush 254, annular slip ring 192 and connecting rod 190. A drive circuit 268 is electrically coupled to the electric post member 162 through communication brush 258, annular slip ring 196 and connecting rod 194.

The electrical contact 146 and the contact surface 172 forms a switch 270. Electrical contact 148 and electrical contact surface 176 form a switch 272. Electrical contact 154 and electrical contact surface 174 form a switch 274. Electrical contact 156 and electrical contact surface 178 form a switch 276.

The switch holding plate 80 and the electrical post members 160, 162 are initially adjusted such that when there is no relative rotation between the input shaft 30 and the pinion shaft 32, the electrical switehes 270, 272, 274 and 276 are open. If the input shaft 30 is rotated clockwise with respect to the pinion shaft 32 an amount, as depicted in FIG. 4A, the switches 270, 276 will close providing electrical connections to the electric assist motor 262 in one direction connecting the positive terminal of the vehicle battery to terminal 264 of the motor and the driver circuit 268 to terminal 266 of the motor.

If the input shaft 30 is rotated counterclockwise with respect to the pinion shaft 32 an amount, as depicted in FIG. 4C, switches 272, 274 will close providing electrical connections to the electric assist motor 262 in the other direction by connecting the positive terminal of the vehicle battery to terminal 266 of the motor and the drive circuit 268 to terminal 264 of the motor. The switches 270, 272, 274, 276 constitute a reversing switch for the motor 262 having a null position providing no electrical connections to the motor terminals when there is no relative rotation between the input shaft 30 and the pinion shaft 32.

The driver circuit 268 is also connected to the negative terminal of the vehicle battery. The negative battery terminal in this specification is also referred to as ground. The driver circuit 268 includes an FET device connected between the electrical post member 162 and ground. The driver circuit 268 provides a variable amount of effective drive current to the motor. When the driver circuit 268 is OFF, no current flows through the assist motor 262. The driver circuit OFF condition is also referred to as providing no drive signal. When the driver circuit 268 is full ON, maximum current will flow through the assist motor 262. The driver circuit full ON condition is also referred to as providing a maximum drive signal.

The driver circuit 268 is controlled by a logic circuit 280. The logic circuit 280 includes a pull-up resistor 282 operatively connected to the positive terminal of the vehicle battery and the resistive strip 220 through the communication brush 242 and slip ring 236. When the fingers 230 of the arm 226 remain in the portion 234 of the resistive strip 220, the resistor 282 will effectively be connected from the positive terminal of the vehicle battery to ground. It will be appreciated that the sets of fingers 230, 232 of the arm 226, the resistive strip 220 and the resistor 282 function as a voltage divider. The voltage at the slip ring 236 is a DC voltage having a value proportional to the amount of relative rotation between the input shaft and the pinion shaft.

The speed and torque of the electric motor is controlled by a pulse width modulation circuit 284. The circuit 284 includes a filter 286, a pulse width modulator 288 and a predriver 290 which generates a control signal to the driver circuit 268 as a function of the voltage between the resistor 282 and the resistance to ground. If the input to the filter 286 is at ground potential, the output of modulator 288 is also at ground which maintains the FET of the driver 268 in an OFF condition.

As the fingers 230 leave the null portion 234 of the resistive strip 220, the impedance between the slip ring 236 and ground increases and the voltage at the input of the filter 286 increases linearly. As the input voltage increases, the control signal from the pulse width modulation circuit 284 causes the driver circuit 268 to generate a pulse width modulated drive signal of increasing pulse width. The duration of the pulse from the modulator controls the ON and OFF time of the FET and therefore controls the amount of current through the motor. A full ON condition would permit maximum current to the motor and provide maximum power assist. A full OFF condition does not permit any current to flow through the motor and provides no power assist. Pulse durations between a full OFF and a full ON condition provide a variable amount of effect drive current to the motor with the amount of current proportional to the pulse duration. Therefore, no drive signal exists when the input shaft and the pinion shaft are in a null position and all the switches 270, 272, 274 and 276 are open. Since the switches will be closed prior to the fingers 230 leaving the portion 234 of the resistive strip 220, switch closure occurs before the driver circuit generates a drive signal. Hence, no arcing occurs during switch closure since no electric potential exists across the motor until the switches are closed.

It will be appreciated that a simplified control apparatus has been disclosed that (i) provides a direct connection of the electric assist motor and the electric drive potential, (ii) provides for a single drive circuit that is appropriately connected to the electric assist motor through a direct switching network, and (iii) provides connections between electric drive potentials and the electric assist motor in a manner that prevents arcing of switch contacts.

If an electrical failure in the driver or logic circuitry should occur, the output of the driver circuit 268 may be (i) in a full OFF condition, (ii) in a full ON condition, or (III) between a full OFF and full ON condition. Such a failure will not undesirably energize the electric motor causing the vehicle to steer unexpectedly since no drive potential signal is applied until the switches close. If the system fails in a full OFF condition, steering maneuvers would be accomplished without assistance. If the system would fail in a full ON condition, all steering maneuvers would be done with maximum assist. If the system fails between full OFF and full ON, all steering maneuvers would have an equal amount of assist at the level of the drive circuit output. It is the mechanical control of the direction of drive potential application and the null condition of no switch closure that solves the prior art problems of electrical failures in an electrical assist system.

In operation, when the vehicle is not subject to a steering manuever, the switches 270, 272, 274 and 276 are open providing no electrical connections to the assist motor 262. Also, if the vehicle is, for example, on ice, there is substantially no resistance to the turning of the vehicle wheels and no torque tending to cause relative rotation between the shafts 30 and 32. Therefore, no electrical connection would be made to the electric assist motor. Under such circumstances, steering would be accomplished without assist from the motor 262.

During a steering maneuver in which the vehicle is on a dry surface, particularly at low vehicle speeds, resistance to the steering maneuver caused by friction on the vehicle wheels will create a torque in the steering column which will cause relative rotation between the input shaft 30 and the pinion shaft 32. If sufficient relative rotation occurs, two of the switches will close depending on the direction of the maneuver. After the switches close, current will flow through the assist motor 262 in a direction controlled by the switches and aid the operator in moving the steering member 22. As the relative rotation increases between the input shaft 30 and the pinion shaft 32 beyond that required to cause switch closure, the amount of the assist given by the assist motor 262 increases. The present invention permits the further relative rotation between the input shaft 30 and the pinion shaft 32. This further relative rotation permits an increase of the effective drive potential after the initial switch contact which is proportional to the further relative rotation. Once the steering maneuver is completed, the input shaft 30 and the pinion shaft 32 return to a relative rotational position sufficient to open the switches. The drive potential decreases and approaches zero as the fingers 230 approach portion 234 which occurs prior to the switches opening. This arrangement prevents arcing during switch opening.

Although the motor terminals 264, 266 were connected to the cam followers 114, 116, respectively, in the above discussion, it will be appreciated that the motor terminals could have been connected to the electrical post members with the positive battery terminal being connected to one of the cam followers and the driver circuit connected to the other cam followers and the system would function in a similar manner.

The drive circuit 268 and the logic circuit 280 are located in a control box 299 attached to the pinion tower 62.

Figure 17:
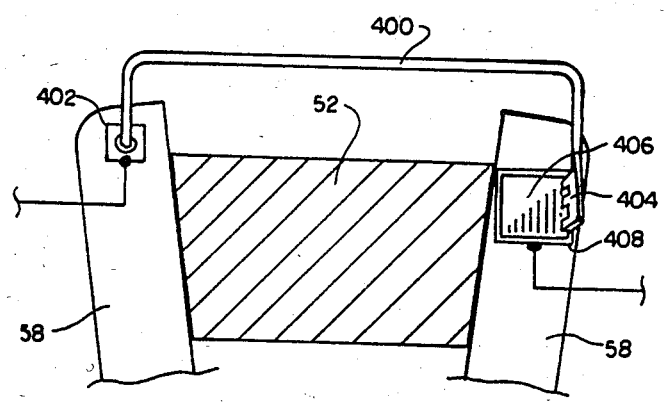
FIG. 17 is an enlarged, side elevational view of part of the apparatus shown in FIG. 14.

It is possible to use other means for sensing the relative rotation between the input shaft 30 and the pinion shaft 32. For example, it is possible to connect a Hall effect device to the input shaft 30 and the pinion shaft 32 in a known manner. The use of a Hall effect device is disclosed in the above incorporated U.S. Pat. No. 4,415,054 to Drutchas. Another sensing means is shown in FIG. 17 and is particularly useful in combination with a CIR-CLIP torsion member shown in FIGS. 14–16. Referring to FIG. 17, an arm 400 is fixed at one end to one lug 58 of the CIR-CLIP 57 and is electrically connected to a substrate 402 also fixed on the one lug 58. The other end of arm 400 has fingers 404 in sliding contact with a resistive strip 406 mounted on a substrate 408 fixed to the other lug 58. The resistive strip 406 is laser trimmed in a known manner. The amount of resistance between substrates 402, 408 varies depending on the position of the fingers 404 on the resistive strip 406. As the shafts 30, 32 are relatively rotated, the lugs 58 are forced apart and the fingers 404 will move across the strip 406. Therefore, the resistance between substrates 402, 408 is proportional to the amount of relative rotation between the shafts 30, 32 and therefore proportional to the amount of applied torque. The functioning of the sensor apparatus shown in FIG. 17 is independent of the direction of relative rotation.

Referring now to FIG. 13, another embodiment of the present invention is shown. In this embodiment, two cam followers 300, 302 are pivotably connected at a common location 304 to an internal brush member 306 which is secured to switch holding plate 307. A cam plate 308 is secured to the input shaft 310 and includes cam surfaces 312, 314, 316 and 318. Cam followers 300, 302 include arms 319, 321 that ride against the cam surfaces 312, 314, respectively. Cam followers 320, 322 are pivotably connected to a common location 324 and are in electrical communication with an internal brush member 326. Cam followers 320, 322 include arms 328, 330 that rides against cam surfaces 316, 318, respectively.

Cam follower 300 has a conductive arm 332 carrying electrical contact 334. Cam follower 302 has a conductive arm 336 carrying electrical contact 338. Cam follower 320 has a conductive arm 340 carrying electrical contact 342. Cam follower 322 has a conductive arm 344 carrying electrical contact 346. Electrical post members 348, 350 are diametrically opposed and secured to switch holding plate 307. Electrical post member 348 has contact surfaces 352, 354 and electrical post member 350 has electrical contact surfaces 356, 358.

When the input shaft and the pinion shaft are in a relative null position, as previously discussed, the cam surfaces 312, 314, 316 and 318 retain their associated cam followers positioned so that the electrical contacts 334, 338, 342, and 346 are spaced from their associated electrical contact surfaces 352, 356, 354 and 358 on the electrical post members 348, 350. Spring 360 retains the cam followers 300, 302 biased against their associated cam surfaces 312, 314. Spring 362 retains the cam followers 320, 322 biased against their associated cam surfaces 316, 318.

As the input shaft is rotated with respect to the pinion shaft, the cam followers will ride against their associated cam surfaces. For example, if the input shaft 310 is rotated clockwise from the position depicted in FIG. 13, electrical contact 338 will contact electrical contact surface 356 and electrical contact 342 will contact electrical contact surface 354. If the input shaft 310 will rotate in a counterclockwise direction from the position depicted in FIG. 13, electrical contact 334 would contact the electrical contact surface 352 and the electrical contact 346 will contact the electrical contact surface 358. Each cam follower operates independent of the other cam followers and that each cam follower carries only one electrical contact. However, the switching function of the second embodiment works similar to that of the preferred embodiment in which a cam follower carries two electrical contacts.

This invention has been described with reference to preferred embodiments. Modifications and alterations may occur to others upon reading and understanding this specification. It is my intention to include all such modifications and alterations insofar as they come within the scope of the appended claims or their equivalent thereof.

Having described preferred embodiments of the invention, the following is claimed:

1. An apparatus for controlling an electric assist steering system having an electric motor drivably connected to a steering member to assist in driving said steering member, said apparatus comprising:

torsion sensing means for providing an output signal that varies in accordance with the amount of force applied to a vehicle hand wheel to accomplish a steering maneuver, said variance occuring after a predetermined amount of force is applied to the vehicle hand wheel;

means responsive to said output signal from said torsion sensing means for generating a variable amount of electrical drive potential to drive said electric motor, the speed of the electric motor varying in accordance with the output signal of said torsion sensing means; and switch means connected to said electric motor and to said generating means and mechanically actuatable in response to a predetermined amount of force applied for connecting said variable amount of electrical drive potential to said electric motor when in an actuated condition.

2. The apparatus of claim 1 wherein said generating means comprises:

an actuable semoconductor switching means for, when actuated, connecting a first energy terminal to said switch means;

control means for controlling the actuation of said actuatable semiconductor switching means for a time in accordance with said output signal of said torsion sensing means; and a second energy terminal connected to said switch means.

3. The apparatus of claim 2 wherein said actuatable semiconductor switching means includes an FET and wherein said control means includes a pulse width modulation circuit for controlling the ON and OFF time of said FET.

4. The apparatus of claim 1 wherein said generating means does not output any electrical drive potential until said torsion sensor means senses force applied to said hand wheel greater than said predetermined amount and wherein said switch means is mechanically actuated before the outputting of any electrical drive potential from said generating means.

5. The apparatus of claim 4 wherein said torsion sensing means includes a potentiometer having an amount of resistance that varies in accordance with the amount of force applied after said force applied is greater than said predetermined value.

6. The apparatus of claim 5 wherein said generating means comprises:

an actuatable semiconductor switching means for, when actuated, connecting a first energy terminal to said electric motor;

control means actuating said actuatable semiconductor switching means for a time in accordance with the amount of resistance of said potentiometer; and a second energy terminal connected to said switch means.

7. The apparatus of claim 1 further including first and second coaxial steering shaft sections connected by an elastic member, said force applied causing relative rotation between said steering shaft sections, said switch means comprising:

camming means coupled to said first shaft section;

cam follower means coupled to said second shaft section and biased against said camming means for responding to relative rotation between said first and second shaft sections;

first electrical contacts carried by said cam follower means;

second electrical contacts coupled to said second shaft section, each first electrical contact having an associated second electrical contact;

said cam means, said cam follower means and said first and second electrical contacts arranged to provide (i) no closure between first electrical contacts and their associated second electrical contacts when said first and second shaft sections are in a relative rotational position defining a null position, (ii) closure between some of said first electrical contacts and their associated second electrical contacts when said first and second shaft sections are relatively rotated with respect to each other in one direction an amount less than a predetermined value from said null position to connect said generating means across said electric motor in one direction, and (iii) closure between the other of said first electrical contacts and their associated second electrical contacts when said first and second shaft sections are relatively rotated with respect to each other in the other direction an amount less than said predetermined value from said null position to connect said generating means across said electric motor in the other direction.

8. The apparatus of claim 1 further including an input shaft connected to a hand wheel and an output shaft connected to a pinion, said input shaft and said output shaft coaxially aligned, connected by an elastic member and relatively rotatable upon said force applied, said switch means comprising:

camming means connected to one of said shafts for driving a follower;

cam follower means connected to the other of said shafts and operatively contacting said camming means for responding to relative rotation between said input shaft and said output shaft;

first set of switch contacts carried by said cam follower means;

second set of switch contacts connected to said other of said shafts, each first switch contact having an associated second switch contact;

said electric motor electrically connected to one set of switch contacts, said generating means connected to the other set of said switch contacts, relative rotation between said input shaft and said output shaft in one direction contacting some of said first switch contacts with their associated second switch contacts to drive said electric motor in one direction and relative rotation between said input shaft and said output shaft in the other direction contacting the other of said first switch contacts with their associated second switch contacts to drive said electric motor in the other direction.

9. An apparatus for controlling an electric assist steering system having an electric motor means drivably connected to a steering member to assist in driving said steering member, said apparatus comprising:

torsion sensing means for providing an output signal indicative of the amount of force applied to a vehicle hand wheel to accomplish a steering maneuver;

actuatable semiconductor switching means for, when actuated, connecting a first energy terminal to a reversing switch means;

control means for generating a pulse width modulated control signal to control actuation of said actuatable semiconductor switching means, the duty cycle of said control signal varying in response to the output signal from said torsion sensing means;

said reversing switch means operatively connected to said motor means, said actuatable semiconductor switching means and a second energy terminal for connecting said actuatable semiconductor switching means and said second energy terminal to said motor responsive to the direction of said steering maneuver.

10. The apparatus of claim 9 wherein said actuatable semiconductor switching means includes an FET and wherein said control signal controls the ON and OFF time of said FET.

11. The apparatus of claim 9 wherein said control means includes means for not actuating said actuatable semiconductor switching means until said torsion sensor means senses an amount of force applied greater than a predetermined value and wherein said reversing switch means connects said actuatable semiconductor switching means and said second energy terminal to said motor before actuation of said actuatable semiconductor switching means.

12. The apparatus of claim 11 wherein said torsion sensing means includes a potentiometer having an amount of resistance across said potentiometer that varies in accordance with the amount of force applied after said force applied is greater than said predetermined value, said control means actuating said actuatable semiconductor switching means for a time in accordance with the amount of resistance across said potentiometer.

13. The apparatus of claim 9 further including first and second coaxial steering shaft sections connected by an elastic member, said force applied causing relative rotation between said steering shaft sections, said reversing switch means comprising:
  camming means coupled to said first shaft section;
  cam follower means coupled to said second shaft section and biased against said camming means for responding to relative rotation between said first and second shaft sections;
  first electrical contacts carried by said cam follower means;
  second electrical contacts coupled to said second shaft section, each first electrical contact having an associated second electrical contact;
  said cam means, said cam follower means and said first and second electrical contacts arranged to provide (i) no closure between first electrical contacts and their associated second electrical contacts when said first and second shaft sections are in a relative rotational position defining a null position, (ii) closure between some of said first electrical contacts and their associated second electrical contacts when said first and second shaft sections are relatively rotated with respect to each other in one direction an amount less than a predetermined value from said null position to connect said semiconductor switching means and said second energy termial across said electric motor means in one direction, and (iii) closure between the other of said first electrical contacts and their associated second electrical contacts when said first and second shaft sections are relatively rotated with respect to each other in the other direction an amount less than said predetermined value from said null position to connect said semicdnductor switching means and said second energy terminal across said electric motor means in the other direction.

14. The apparatus of claim 9 further including an input shaft connected to a hand wheel and an output shaft connected to a pinion, said input shaft and said output shaft coaxially aligned, connected by an elastic member and relatively rotatable upon said force applied, said reversing switch means comprising:
  camming means connected to one of said shafts for driving a follower;
  cam follower means connected to the other of said shafts and operatively contacting said camming means for responding to relative rotation between said input shaft and said output shaft;
  first set of switch contacts carried by said cam follower means;
  second set of switch contacts connected to said other of said shafts, each first switch contact having an associated second switch contact;

said electric motor electrically connected to one set of switch contacts, said semiconductor switching means and said second energy terminal connected to the other set of said switch contacts, relative rotation between said input shaft and said output shaft in one direction contacting some of said first switch contacts with their associated second switch contacts to drive said electric motor in one direction upon actuation of said semiconductor switch means and relative rotation between said input shaft and said output shaft in the other direction contacting the other of said first switch contacts with their associated second switch contacts to drive said electric motor in the other direction upon actuation of said semiconductor switching means.

15. An apparatus for controlling an electric assist steering system having electric motor means drivably connected to a steering member to assist in driving said steering member, said apparatus comprising:
  torsion sensing means for providing an output signal indicative of the amount of force applied to a vehicle hand wheel to accomplish a steering maneuver;
  means for generating a variable amount of electrical drive energy for driving said electric motor means responsive to said output signal from said torsion sensing means, said generating means not outputting any electrical drive energy until the output signal from said torsion sensing means reaches a predetermined value; and
  switch means for connecting said generating means to said motor means in response to the direction of said steering maneuver prior to said generating means outputting any electrical drive energy.

16. The apparatus of claim 15 wherein said generating means comprises:
  an actuatable semiconductor switching means for, when actuated, connected a first energy terminal to said switch means;
  a second energy terminal connected to said switch means; and
  control means for controlling the actuation of said actuatable semiconductor switching means responsive to said output signal from said torsion sensing means and preventing actuation of said actuatable semiconductor switching means until the torsion sensing means output signal reaches said predetermined value, said switch means making said connections to said motor means prior to actuation of said semiconductor switching means.

17. The apparatus of claim 16 wherein said actuatable semiconductor switching means includes an FET and wherein said control means includes a pulse width modulation circuit for controlling the ON and OFF time of said FET.

18. The apparatus of claim 17 wherein said torsion sensing means includes a potentiometer having an amount of resistance across said potentiometer that varies in accordance with the amount of force applied after said force applied is greater than said predetermined amount.

19. The apparatus of claim 15 further including first and second coaxial steering shaft sections connected by an elastic member, said force applied causing relative rotation between said steering shaft sections, said switch means comprising:
  camming means coupled to said first shaft section;

cam follower means coupled to said second shaft section and biased against said camming means for responding to relative rotation between said first and second shaft sections;

first electrical contacts carried by said cam follower means;

second electrical contacts coupled to said second shaft section, each first electrical contact having an associated second electrical contact;

said cam means, said cam follower means and said first and second electrical contacts arranged to provide (i) no closure between first electrical contacts and their associated second electrical contacts when said first and second shaft sections are in a relative rotational position defining a null position, (ii) closure between some of said first electrical contacts and their associated second electrical contacts when said first and second shaft sections are relatively rotated with respect to each other in one direction an amount less than a predetermined value from said null position to connect said generating means across said electric motor means in one direction, and (iii) closure between the other of said first electrical contacts and their associated second electrical contacts when said first and second shaft sections are relatively rotated with respect to each other in the other direction an amount less than said predetermined value from said null position to connect said generating means across said electric motor means in the other direction.

20. The apparatus of claim 15 further including an input shaft connected to a hand wheel and an output shaft connected to a pinion, said input shaft and said output shaft coaxially aligned, connected by an elastic member and relatively rotatable upon said force applied, said switch means commprising:

camming means connected to one of said shafts for driving a follower;

cam follower means connected to the other of said shafts and operatively contacting said camming means for responding to relative rotation between said input shaft and said output shaft;

first set of switch contacts carried by said cam follower means;

second set of switch contacts connected to said other of said shafts, each first switch contact having an associated second switch contact;

said electric motor means electrically connected to one set of switch contacts, said generating means connected to the other set of said switch contacts, relative rotation between said input shaft and said output shaft in one direction contacting some of said first switch contacts with their associated second switch contacts to connect said generating means across said electric motor means in one direction and relative rotation between said input shaft and said output shaft in the other direction contacting the other of said first switch contacts with their associated second switch contacts to connect said generating means across said electric motor means in the other direction.

21. An apparatus for controlling an electric assist motor in an electric power assist steering system having first and second coaxial steering shaft sections connected by an elastic member, said apparatus comprising:

camming means coupled to said first shaft section;

cam follower means coupled to said second shaft section for responding to relative rotation between said first and second shaft sections;

first electrical contacts carried by said cam follower means;

second electrical contacts coupled to said second shaft section, each first electrical contact having an associated second electrical contact;

said cam means, said cam follower means and said first and second electrical contacts arranged to provide (i) no closure between first electrical contacts and their associated second electrical contacts when said first and second shaft sections are in a relative rotational position defining a null position, (ii) closure between some of said first electrical contacts and their associated second electrical contacts when said first and second shaft sections are relatively rotated with respect to each other in one direction an amount less than a predetermined value from said null position, and (iii) closure between the other of said first electrical contacts and their associated second electrical contacts when said first and second shaft sections are relatively rotated with respect to each other in the other direction an amount less than said predetermined value from said null position.

22. The apparatus of claim 21 wherein said cam follower means is in electrical communication with said first electrical contacts carried thereby and said apparatus further includes:

internal brush members carried by said second shaft section, each internal brush member having said cam follower means pivotally and slidably mounted thereto and in electrical brush surface contact therewith;

means for biasing said cam follower means against said camming means;

post members coupled to said second shaft section, each post member carrying at least one of said second electrical contacts and in electrical communication therewith;

a plurality of electrical connecting rods, each of said brush members and each of said post members having a connecting rod operatively connected thereto, said rods extending parallel with the axis of rotation of said first and second shaft sections;

a plurality of axially spaced slip rings, each slip ring being operatively connected to one of said connecting rods;

a plurality of communication brushes, each slip ring having an associated communication brush; and means to bias each of said communication brushes against its associated slip ring.

23. The apparatus of claim 22 further including:

drive means operatively coupled to a first and a second communication brush;

said electric assist motor having first and second connection terminals operatively connected to a third and fourth communication brush, respectively;

said electric assist motor (i) not electrically connected to said drive means when said first and second shaft sections are in said null position, (ii) connected to said drive means in one direction when said first and second shaft sections are relatively rotated in said one directon an amount less than said predetermined value, and (iii) connected to said drive means in another direction when said first and second shaft sections are relatively rotated in said other direction an amount less than said predetermined value.

24. The apparatus of claim 23 further including sensing means for sensing the relative rotation between said first and second shaft sections.

25. The apparatus of claim 24 wherein said drive means includes control means for controlling the amount of said effective drive potential responsive to said sensing means.

26. The apparatus of claim 25 wherein said control means permits no effective drive potential to be outputted from said drive means until said first and second shaft sections are relatively rotated by an amount equal to said predetermined value.

27. The apparatus of claim 21 wherein said cam means includes a plurality of cam faces and wherein said cam follower means includes a plurality of cam followers, each cam follower associated with at least one cam face.

28. A control apparatus for use in a power assist steering system of the type having an electric assist motor mechanically coupled to a steering member and having a steering shaft including first and second coaxial shaft sections rotatable with respect to each other and coupled to each other by an elastic member, one of said shaft sections coupled to an operator steering wheel and the other of said shaft sections coupled to said steering member, said apparatus comprising:
cam means fixed to said first shaft section and having first and second cam faces; and
cam followers, each of said cam faces having an associated cam follower, each cam follower coupled to said second shaft section and carrying first and second electrical contacts, each of said electrical contacts having associated mating electrical contacts, said first and second electrical contacts and their associated mating electrical contacts of each cam follower defining first and second electrical switches associated with such cam follower, said electric assist motor coupled to each electrical switch of each cam follower; and
electrical drive means connected across the switches associated with one of said cam followers and the switches associated with the other of said cam followers;
said electric switches arranged to provide (i) no electrical connections of said electrical drive means to said electric assist motor when said first and second shaft sections are in a relative rotational position defining a null position, (ii) electrical connections of said electrical drive means across said electric assist motor in one direction when said first shaft section is rotated in one direction an amount less than a predetermined value from said relative null position, and (iii) electrical connections of said electrical drive means across said electric assist motor in the other direction when said first shaft section is rotated in the other direction an amount less than said predetermined value from said relative null position.

29. The apparatus of claim 28 further including spring bias means coupled to each cam follower to bias said cam followers against their associated cam faces.

30. The apparatus of claim 29 further including sensing means for generating an electrical signal in response to the amount of relative rotation between said first and second shaft sections.

31. The apparatus of claim 30 further including control means for controlling an amount of effective drive potential from said electrical drive means responsive to the output signal of said sensing means.

32. The apparatus of claim 31 wherein said control means controls said electrical drive means to output substantially no effective drive potential across said electric assist motor until said first and second shaft sections are rotated with respect to each other by an amount equal to said predetermined value.

33. An apparatus for controlling an electric motor in an electric assist steering system having an input shaft connected to a hand wheel and an output shaft connected to a pinion, said input shaft and said output shaft coaxially aligned, connected by an elastic member and relatively rotatable upon applied steering torque, said apparatus comprising:
camming means connected to one of said shafts for driving a follower;
cam follower means connected to the other of said shafts and operatively contacting said camming means for responding to relative rotation between said input shaft and said output shaft;
first set of switch contacts carried by said cam follower means;
second set of switch contacts connected to said other of said shafts, each first switch contact having an associated second switch contact;
said electric motor electrically connected to one set of switch contacts, and
electric drive means for energizing said electric motor electrically connected to the other set of said switch contacts;
relative rotation between said input shaft and said output shaft in one direction contacting some of said first switch contacts with their associated second switch contacts to drive said electric motor in one direction and relative rotation between said input shaft and said output shaft in the other direction contacting the other of said first switch contacts with their associated second switch contacts to drive said electric motor in the other direction.

34. The apparatus of claim 33 further including torsion sensing means for measuring the amount of said applied steering torque.

35. The apparatus of claim 34 further including control means operatively connected to said torsion sensing means and said electrical drive means for controlling said electrical drive means responsive to the sensed amount of torque.

36. The apparatus of claim 35 wherein said control means includes means to prevent said electric drive means from outputting a drive signal for said electric motor until said torsion sensing means senses a predetermined amount of applied torque.

37. The apparatus of claim 36 wherein said electric drive means includes an FET and said control means includes a pulse width modulation circuit controlling the ON and OFF duty cycle of said FET.

38. The apparatus of claim 33 wherein said camming means includes two diametrically opposed cam faces and said cam follower means includes two cam followers, each cam face having an associated cam follower operatively biased thereagainst, each cam follower carrying two first switch contacts.

39. An apparatus for controlling an electric assist steering system having an electric motor drivably connected to a steering member to assist in driving said steering member, said apparatus comprising:

torsion sensing means for providing an output signal indicative of the amount of force applied to a vehicle hand wheel to accomplish a steering maneuver;

means for generating a variable amount of electrical drive potential for driving said electric motor in accordance with the output signal of said torsion sensing means; and switch means connected to said electric motor and to said generating means and mechanically actuatable in response to a predetermined amount of force applied for connecting said variable amount of electrical drive potential to said electric motor when in an actuated condition;

said generating means comprising an actuatable semiconductor switching means including an FET for, when actuated, connecting a first energy terminal to said switch means, control means including a pulse width modulation circuit for controlling the ON and OFF time of said FET in accordance with said output signal of said torsion sensing means, and a second energy terminal connected to said switch means.

40. An apparatus for controlling an electric assist steering system having an electric motor drivably connected to a steering member to assist in driving said steering member, said apparatus comprising:

torsion sensing means for providing an output signal indicative of the amount of force applied to a vehicle hand wheel to accomplish a steering maneuver, said torsion sensing means including a potentiometer having an amount of resistance that varies in accordance with the amount of force applied after said force applied is greater than a predetermined value;

means for generating a variable amount of electrical drive potential for driving said electric motor in accordance with the output signal of said torsion sensing means, said generating means including means for not permitting outputting of any electrical drive potential until said torsion sensor means senses an amount of force applied greater than said predetermined value; and switch means connected to said electric motor and to said generating means and mechanically actuatable in response to a predetermined amount of force applied for connecting said variable amount of electrical drive potential to said electric motor when in an actuated condition, said switch means being mechanically actuated before the outputting of any electrical drive potential from said generating means.

41. The apparatus of claim 40 wherein said generating means comprises:

an actuatable semiconductor switching means for, when actuated, connected a first energy terminal to said electric motor;

control means actuating said actuatable semiconductor switching means for a time in accordance with the amount of resistance of said potentiometer; and a second energy terminal connected to said switch means.

42. An apparatus for controlling an electric assist steering system having an electric motor drivably connected to a steering member to assist in driving said steering member, said apparatus comprising:

first and second coaxial steering shaft sections connected by an elastic member, force applied to a vehicle hand wheel causing relative rotation between said steering shaft sections;

torsion sensing means for providing an output signal indicative of the amount of force applied to said vehicle hand wheel to accomplish a steering maneuver;

means for generating a variable amount of electrical drive potential for driving said electric motor in accordance with the output signal of said torsion sensing means; and switch means connected to said electric motor and to said generating means and mechanically actuatable in response to a predetermined amount of force applied for connecting said variable amount of electrical drive potential to said electric motor when in an actuated condition, said switch means including, camming means coupled to said first shaft section, cam follower means coupled to said second shaft section and biased against said camming means for responding to relative rotation between said first and second shaft sections, first electrical contacts carried by said cam follower means, second electrical contacts coupled to said second shaft section, each first electrical contact having an associated second electrical contact, said cam means, said cam follower means and said first and second electrical contacts arranged to provide (i) no closure between first electrical contacts and their associated second electrical contacts when said first and second shaft sections are in a relative rotational position defining a null position, (ii) closure between some of said first electrical contacts and their associated second electrical contacts when said first and second shaft sections are relatively rotated with respect to each other in one direction an amount less than a predetermined value from said null position to connect said generating means across said electric motor in one direction, and (iii) closure between the other of said first electrical contacts and their associated second electrical contacts when said first and second shaft sections are relatively rotated with respect to each other in the other direction an amount less than said predetermined value from said null position to connect said generating means across said electric motor in the other direction.

43. An apparatus for controlling an electric assist steering system having an electric motor drivably connected to a steering member to assist in driving said steering member, said apparatus comprising:

an input shaft connected to a hand wheel and an output shaft connected to a pinion, said input shaft and said output shaft coaxially aligned, connected by an elastic member and relatively rotatable upon said force applied;

torsion sensing means for providing an output signal indicative of the amount of force applied to a vehicle hand wheel to accomplish a steering maneuver;

means for generating a variable amount of electrical drive potential for driving said electric motor in accordance with the output signal of said torsion sensing means; and switch means connected to said electric motor and to said generating means and mechanically actuatable in response to a predetermined amount of force applied for connecting said variable amount of electrical drive potential to said electric motor when in an actuated condition, said switch means comprising camming means connected to one of said shafts for driving a follower, cam follower means connected to the other of said shafts and operatively contacting said camming means for responding to relative rotation between said input shaft and said output shaft, first set of switch contacts carried by said cam follower means, second set of switch contacts connected to said other of said shafts, each first switch contact having an associated second switch contact, said electric motor electrically connected to one set of switch contacts, said generating means connected to the other set of said switch contacts, relative rotation between said input shaft and said output shaft in one direction contacting some of said first switch contacts with their associated second switch contacts to drive said electric motor in one direction and relative rotation between said input shaft and said output shaft in the other direction contacting the other of said first switch contacts with their associated second switch contacts to drive said electric motor in the other direction.

44. An apparatus for controlling an electric assist steering system having an electric motor means drivably connected to a steering member to assist in driving said steering member, said apparatus comprising:

torsion sensing means for providing an output signal indicative of the amount of force applied to a vehicle hand wheel to accomplish a steering maneuver;

actuatable semiconductor switching means including an FET for, when actuated, connecting a first energy terminal to a reversing switch means;

control means including a pulse width modulation circuit for controlling the ON and OFF time of said FET in response to the torsion sensing means output signal;

said reversing switch means operatively connected to said motor means, said actuatable semiconductor switching means and a second energy terminal for connecting said actuatable semiconductor switching means and said second energy terminal to said motor responsive to the direction of said steering maneuver.

45. An apparatus for controlling an electric assist steering system having an electric motor means drivably connected to a steering member to assist in driving said steering member, said apparatus comprising:

torsion sensing means for providing an output signal indicative of the amount of force applied to a vehicle hand wheel to accomplish a steering maneuver, said torsion sensing means including a potentiometer having an amount of resistance across said potentiometer that varies in accordance with the amount of force applied after said force applied is greater than a predetermined value;

actuatable semiconductor switching means for, when actuated, connecting a first energy terminal to a reversing switch means;

control means for controlling the actuation of said actuatable semiconductor switching means for a time in response to the amount of resistance across said potentiometer, said control means including means for not actuating said actuatable semiconductor switching means until said torsion sensor means senses an amount of force applied greater than said predetermined value;

said reversing switch means operatively connected to said motor means, said actuatable semiconductor switching means and a second energy terminal for connecting said actuatable semiconductor switching means and said second energy terminal to said motor responsive to the direction of said steering maneuver, aaid reversing switch means connecting said actuatable semiconductor switching means and said second energy terminal to said motor before actuation of said actuatable semiconductor switching means.

46. An apparatus for controlling an electric assist steering system having an electric motor means drivably connected to a steering member to assist in driving said steering member, said apparatus comprising:

first and second coaxial steering shaft sections connected by an elastic member, force applied to a vehicle hand wheel causing relative rotation between said steering shaft sections;

torsion sensing means for providing an output signal indicative of the amount of force applied to a vehicle hand wheel to accomplish a steering maneuver;

actuatable semiconductor switching means for, when actuated, connecting a first energy terminal to a reversing switch means;

control means for controlling the actuation of said actuatable semiconductor switching means for a time in response to the torsion sensing means output signal;

said reversing switch means operatively connected to said motor means, said actuatable semiconductor switching means and a second energy terminal for connecting said actuatable semiconductor switching means and said second energy terminal to said motor responsive to the direction of said steering maneuver, said reversing switch means including, camming means coupled to said first shaft section, cam follower means coupled to said second shaft section and biased against said camming means for responding to relative rotation between said first and second shaft sections, first electrical contacts carried by said cam follower means, second electrical contacts coupled to said second shaft section, each first electrical contact having an associated second electrical contact, said cam means, said cam follower means and said first and second electrical contacts arranged to provide (i) no closure between first electrical contacts and their associated second electrical contacts when said first and second shaft sections are in a relative rotational position defining a null position, (ii) closure between some of said first electrical contacts and their associated second electrical contacts when said first and second shaft sections are relatively rotated with respect to each other in one direction an amount less than a predetermined value from said null position to connect said semiconductor switching means and said second energy terminal across said electric motor means in one direction, and (iii) closure between the other of said first electrical contacts and their associated second electrical contacts when said first and second shaft sections are relatively rotated with respect to each other in the other direction an amount less than said predetermined value from said null position to connect said semiconductor switching means and said second energy terminal across said electric motor means in the other direction.

47. An apparatus for controlling an electric assist steering system having an electric motor means drivably connected to a steering member to assist in driving said steering member, said apparatus comprising:

an input shaft connected to a hand wheel and an output shaft connected to a pinion, said input shaft and said output shaft coaxially aligned, connected by an elastic member and relatively rotatable upon said force applied;

torsion sensing means for providing an output signal indicative of the amount of force applied to a vehicle hand wheel to accomplish a steering maneuver;

actuatable semiconductor switching means for, when actuated, connecting a first energy terminal to a reversing switch means;

control means for controlling the actuation of said actuatable semiconductor switching means for a time in response to the torsion sensing means output signal;

said reversing switch means operatively connected to said motor means, said actuatable semiconductor switching means and a second energy terminal for connecting said actuatable semiconductor switching means and said second energy terminal to said motor responsive to the direction of said steering maneuver, said reversing switch means including camming means connected to one of said shafts for driving a follower, cam follower means connected to the other of said shafts and operatively contacting said camming means for responding to relative rotation between said input shaft and said output shaft, first set of switch contacts carried by said cam follower means, second set of switch contacts connected to said other of said shafts, each first switch contact having an associated second switch contact, said electric motor electrically connected to one set of switch contacts, said semiconductor switching means and said second energy terminal connected to the other set of said switch contacts, relative rotation between said input shaft and said output shaft in one direction contacting some of said first switch contacts with their associated second switch contacts to drive said electric motor in one direction upon actuation of said semiconductor switch means and relative rotation between said input shaft and said output shaft in the other direction contacting the other of said first switch contacts with their associated second switch contacts to drive said electric motor in the other direction upon actuation of said semiconductor switching means.

* * * * *